Oct. 25, 1938.   J. M. HALL ET AL   2,133,987
CHANGE SPEED GEARING
Filed Nov. 6, 1933   2 Sheets-Sheet 1
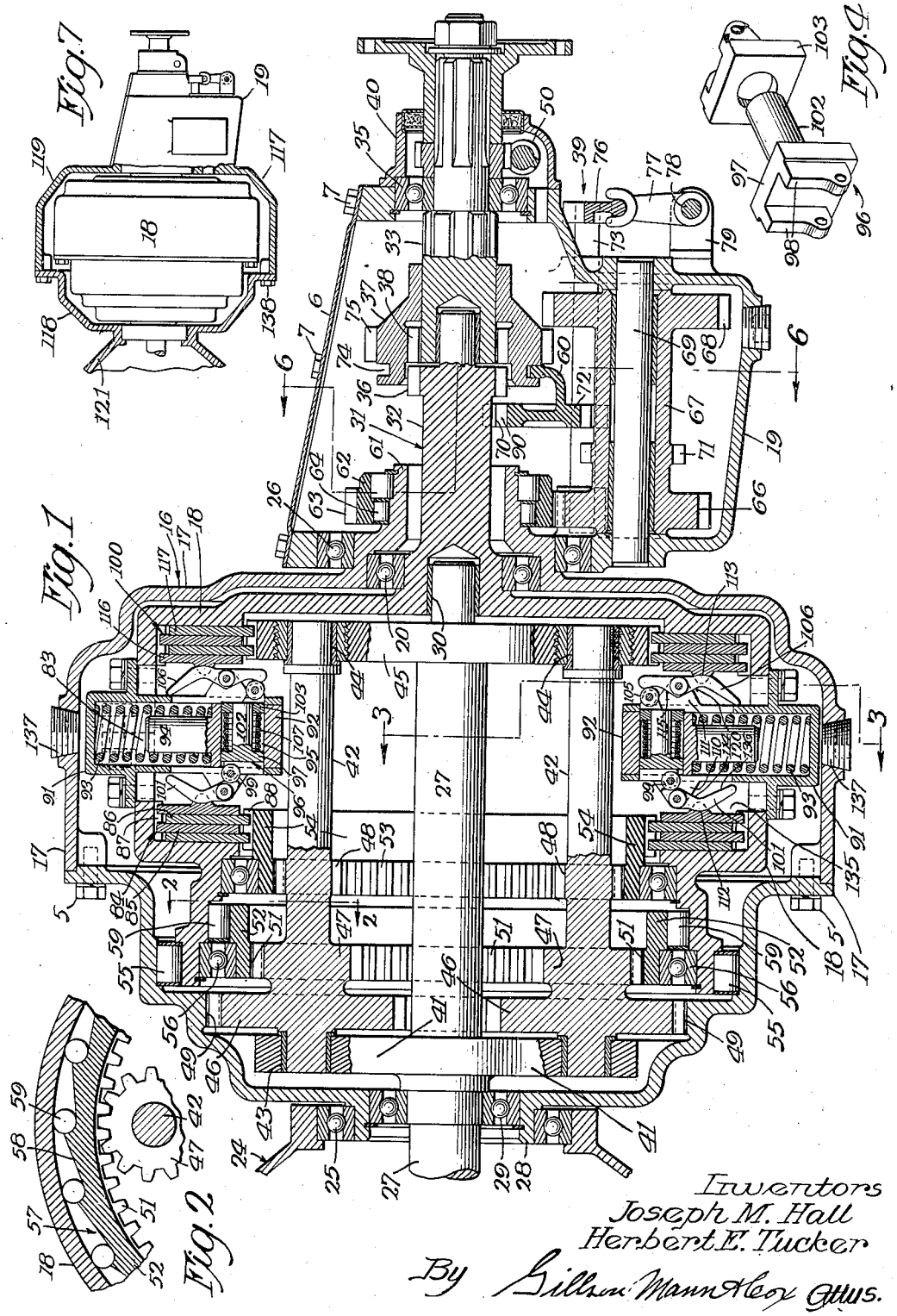
Inventors
Joseph M. Hall
Herbert E. Tucker Oct. 25, 1938.    J. M. HALL ET AL    2,133,987
CHANGE SPEED GEARING
Filed Nov. 6, 1933    2 Sheets-Sheet 2
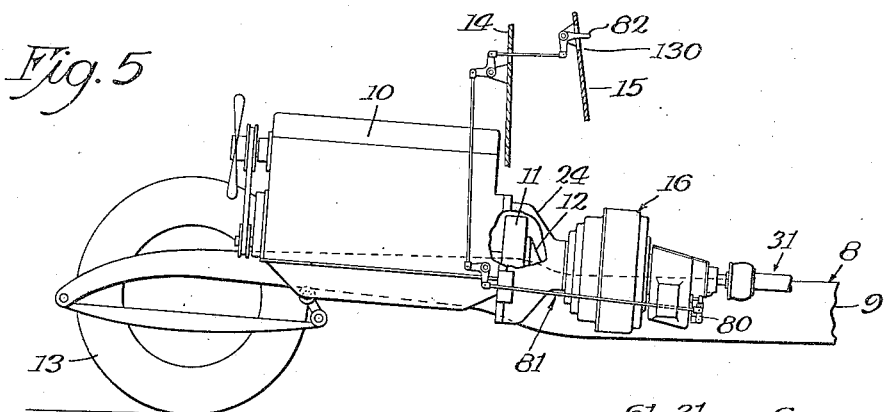
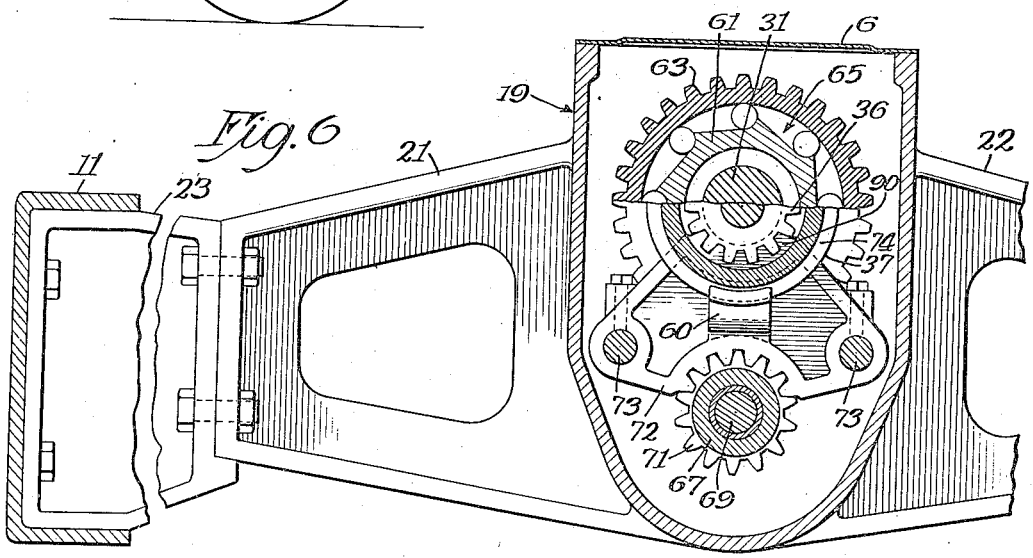
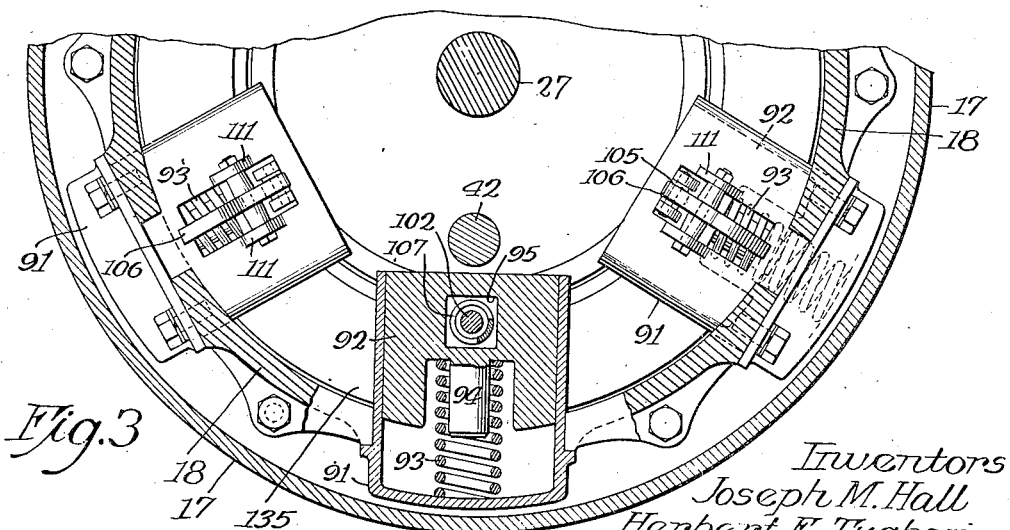
Inventors
Joseph M. Hall
Herbert E. Tucker
By Gillson Mauser Cox Attys.

Patented Oct. 25, 1938

2,133,987

UNITED STATES PATENT OFFICE 2,133,987

CHANGE SPEED GEARING

Joseph M. Hall and Herbert E. Tucker, Chicago, Ill.

Application November 6, 1933, Serial No. 696,773

14 Claims. (Cl. 74—260)

This invention relates to change speed mechanism.

One of the objects of the invention is the provision of a new and improved change speed mechanism that is so constructed that it will automatically change from low to high speeds.

Another object of the invention is the provision of an intermeshed gear change speed mechanism interposed between a driving and a driven shaft that is capable of changing the speed of a driven shaft from low to higher speeds without disengaging the gears.

A still further object of the invention is the provision of a new and improved change speed mechanism that is adapted for automobiles and the like and which is capable of three speeds forward and one reverse and that automatically changes from low to higher speeds when the speed of the vehicle reaches a predetermined minimum.

A further object of the invention is the provision of change speed mechanism interposed between a driving and a driven shaft that automatically changes from lower to higher speeds when the speed of the driving shaft exceeds a predetermined minimum and which will automatically change from a higher to a lower speed when the speed of said driving shaft drops below a predetermined minimum.

A still further object of the invention is the provision of a new and improved change speed mechanism that is simple in construction, composed of comparatively few parts, occupies the minimum space, which is efficient in operation, rugged in construction and not likely to become broken or get out-of-repair.

Other and further objects and advantages of the invention will appear from the following description, taken in connection with the accompanying drawings, in which—

Fig. 1 is a vertical section of the change speed mechanisms;

Fig. 2 is a section on the line 2—2 of Fig. 1;

Fig. 3 is a section on the line 3—3 of Fig. 1;

Fig. 4 is a perspective view of a part of the clutch operating mechanism;

Fig. 5 is a side elevation of a portion of a vehicle showing the invention in position thereon with parts broken away and parts removed for the sake of clearness;

Fig. 6 is a section on the line 6—6 of Fig. 1; and

Fig. 7 is a side elevation of a modified form of the construction with the outer casing in section and parts broken away.

In order to disclose one embodiment of the invention, the same will be described as being used in connection with an automobile. While the device is especially useful in motor vehicles, it is understood that it may be used in other relations and that the disclosure is for illustrative purposes only.

Referring now to the drawings, the reference character 8 designates an automobile provided with the chassis frame 9, engine 10 having crank shaft and fly wheel 11, clutch 12 and supporting wheels 13. The dash is shown at 14 and instrument board at 15. The automobile is of the conventional type, except for the transmission, parts being omitted for the sake of clearness.

The change speed mechanism, which is shown at 16, comprises the rotatable outer casing 17, inner casing 18 and the stationary casing or gear support 19 (see Figs. 1, 5 and 6 of the drawings). The stationary casing 19 has supporting arms 21 and 22 extending laterally therefrom (see Fig. 6). These arms are attached at their outer ends to suitable brackets 23 which in turn are rigidly connected to the chassis frame 11, as shown more particularly in Fig. 6 of the drawings.

The outer casing is formed of two sections for the purpose of facilitating the assembling of the parts. The two sections are connected together as by means of the cap screws 5. The inner section is open at its forward end. The stationary section 19 is open at its upper side and the opening is closed by a lid or closure 6 secured in position in any suitable manner, as by means of the cap screws 7.

The forward end of the outer casing 17 is journaled in the clutch housing 24 by means of suitable anti-friction bearings, such as the ball bearings 25. The rear end of the outer casing 17 is journaled in the forward end of the stationary casing 19 in any suitable manner, as by means of ball bearings 26 or other suitable anti-friction bearings. The driving or power shaft 27 of the engine 12 is rotatably mounted in the reduced outer or forward end 28 of the outer casing 17 in any suitable manner, as by means of anti-friction or ball bearings 29. The rear end of the shaft is journaled in the forward end of the driven shaft 31, as at 30. The forward end of the driven shaft 31 is rigidly connected to the inner casing 18 as by being integral therewith and is journaled in the outer casing 17 in any suitable manner as by means of the ball bearings 20.

The driven shaft 31 is in sections, the forward section 32 and the rear section 33. The rear section 33 is adapted to be connected to the shaft which drives the differential and rear axle by a suitable universal joint, as is usual in such constructions. The rear section 33 is journaled in the outer end of the stationary casing 19 in any suitable manner, as by means of the ball bearings 35. A housing 40 at the rear of the casing 19 encloses the conventional speedometer drive 50 (see Fig. 1).

The sections 32 and 33 of the driven shaft are adapted to be connected together in any suitable manner. In the form of construction shown, the rear end of the shaft 32 is provided with clutch teeth 36 which are adapted to be engaged by a clutch element 37 keyed to but slidably mounted on the forward end of the section 33. This element is provided with corresponding clutch teeth 38 which are adapted to engage the clutch teeth 36 on the section 32. Clutch shifting mechanism 39 is provided for shifting the clutch member 37, as will presently appear.

First or low speed

The mechanism for transmitting the power from the driving shaft 27 to the driven shaft 31 for operating the latter at a reduced speed will now be described. In the form of construction shown, the driving shaft 27 is provided at its forward end with a plurality of arms 41 extending radially therefrom adjacent to the bearings 29 within the outer casing 17 or a disk may be employed instead of the arms. A plurality of countershafts 42 have their forward ends journaled, as at 43, in a corresponding arm 41 of the shaft 27. The countershafts 42 are similar in construction and only one need be described. Any suitable number of these shafts may be employed, two being shown on the drawings. The rear end of the shaft 42 is journaled, as at 44, in a disk 45 or the like rigidly connected to the shaft 27 at its rear end within the inner casing 18. Each of the countershafts 42 is provided with a plurality of pinions having a progressively smaller number of teeth. In the form of construction shown, three pinions 46, 47 and 48 are employed. The pinion 46 is in mesh with an internal gear 49 rigidly connected to the interior of the forward portion of the outer casing 17. The pinion 47, which may be termed the first speed pinion, is in mesh with an internal gear 51 on an annular member 52, which, for convenience of description, will be termed the first speed annular member. The pinion 48, which may be termed the second speed pinion, is in mesh with the internal gear 53 of the annular member 54, which, for convenience of description, will be termed the annular second speed member.

The inner casing or gear support 18 is open at its forward end and is journaled as by means of anti-friction bearings 55 in the outer casing 16. The annular member 52 is journaled in the forward end of the inner casing, as by means of anti-friction bearings 56.

Suitable means are provided for driving the inner casing 18 from the annular member 52 when driving at first speed, but permitting the casing 18 to overrun the annular member 52 when the device is operating at second speed, as will presently appear. Any suitable mechanism may be employed for this purpose. In the form of construction illustrated (see Fig. 2), an overrunning clutch mechanism 57 is used. As shown, the first speed annular member 52 is provided with recesses having inclined bottom walls 58 (see Fig. 2) within which are rotatably mounted cylindrical clutch members 59 which will permit the casing 18 to rotate freely toward the left in Fig. 2.

When the annular member 52 overruns the casing 18, the clutch members 59 will ride up into the narrow portions of the slots and frictionally engage the casing 18, causing the same to rotate therewith and drive the vehicle at first speed. When the device is operating at first speed, the drive will be through the shaft 27, the gears 49 and 51, cooperating pinions 46 and 47 to the driven shaft 31 in the following manner: Assuming that the shaft 27 is a power shaft of an internal combustion engine of a motor vehicle, the top of same will turn toward the right when viewed from the front of the machine. Since the pinion 46 is in mesh with the internal gear 49, the pinions 46 will tend to rotate in the opposite direction to that of the shaft 27, thereby causing the pinion 47 to also rotate in the opposite direction from the shaft 27. The gear ratio of the gear 49 and pinion 46 is less than the gear ratio of the gear 51 and pinion 47. Since the distance between the axes of the gears and pinions is fixed, the difference in the number of teeth between any gear and its pinion remains constant but the gear ratio varies. It will thus be seen that if the outer casing 17 be held from turning, the annular member 52 will be advanced at each rotation of the arms 41, that is, it will be rotated in the same direction as the shaft 27, but at a much slower speed. This member through the overrunning clutch mechanism 57 will rotate the inner casing 18, thereby transmitting power to the driven shaft 31 in the same direction as the shaft 27 but at a slower speed.

The means for holding the casing 17 from rotating while the device is operating at first speed will now be described. The outer casing 17 is provided at its rear end with the hub 61 on which is rotatably mounted a ring gear 62 having its external teeth 63 thereon. An anti-friction bearing 64 may be employed between the ring gear 62 and the hub 61. Suitable means are also provided for locking the ring gear 62 to the hub 61 when the hub overruns the ring gear 62 which it tends to do when rotated in a direction contra to the shaft 27 but permitting the hub to turn freely in the opposite direction. An overrunning clutch mechanism 65 similar to the overrunning clutch mechanism 57 may be employed for this purpose. Since this mechanism is substantially the same as that described above (as shown in Fig. 6), it is not thought necessary to repeat the description at this point. This device permits the hub 61 to overrun the ring gear 62 when the same is moving in the direction of the shaft 27, but when turning in the opposite direction, it will prevent the hub from overrunning the gear.

Appropriate means are provided for locking the ring gear 62 from rotation. In the form of construction shown, the ring gear 62 is in mesh with a pinion 66 which is rigidly connected to a sleeve 67 on the opposite end of which is mounted a pinion 68. The sleeve 67 is journaled on a suitable shaft 69 in the casing 19. The sleeve 67 has a series of clutch teeth 71 extending about its periphery which are adapted to be engaged by shifter or selector member 72. The shifter or selector member 72 is rigidly connected to rods 73 that are in turn slidably mounted in the stationary casing 19.

The shifter or selector member 72 is concave on its lower surface and provided with teeth for meshing with the teeth 71. The upper end of the shifter member 72 is concave, as at 70, and is provided with internal teeth 90 for engaging the pinion 36 for reverse, as will presently appear. It is also provided with a shifter arm 60 which engages grooves 74 in the forward end of the clutch member 37 for operating said member. The clutch member 37 is provided on its periphery with teeth 75 which are adapted to slidably engage the teeth of the gear 68.

Suitable means are provided for shifting the rods 73, and with them the shifter or selector member 72. In the form of construction shown, the rear ends of the rod are connected together by a bar 76 which is provided on its lower side with a curved surface that engages in a recess in the arm 77. The arm 77 is rigidly connected to a shaft 78 which in turn is pivoted in suitable brackets 79 rigidly mounted on the rear end of the casing 19. An arm 80 (see Fig. 5) is rigidly connected to the shaft 78 for rotating said shaft.

Suitable means are provided for operating the shifting mechanism when the change speed device is employed on a motor vehicle, as shown in Fig. 5 of the drawings. As shown, a system of links and bell crank levers 81 adapted to be operated by a hand lever 82 mounted on the instrument board 15 is employed for this purpose. The lever arm 82 extends through the instrument board and a suitable indicator 130 may be employed for designating the proper position for the arm 82.

When it is desired to start the car, the arm 82 is moved upwardly which will shift the selector member 72 into engagement with the teeth clutch 71 on the sleeve 67, and simultaneously shift the clutch element 37 into engagement with the clutch teeth 36 on the section 32 of the driven shaft 31. The reaction of the pinion 46 on the gear 49 tends to rotate that gear and with it the outer casing 17 counterclockwise, but the overrunning clutch 65, pinion 66 and shifter member hold the outer casing from rotating in that direction and the inner casing is driven slowly in a clockwise direction, as described above.

*Second, or intermediate, speed*

Suitable means are provided for automatically shifting into second speed when the rotation of the driving shaft 27 exceeds a predetermined speed. In the form of construction shown, this is accomplished by centrifugal mechanism 83 which operates clutch device 84 which in turn locks the inner casing 18 to the second speed ring gear 54. The inner casing 18 is provided with an annular recess 135 in which the clutch device 84 is mounted. This clutch comprises two sets of intercalated clutch disks 85 and 86. The clutch disks 85 are provided with notches on their peripheral edge which are adapted to interlock with suitable lugs 87 on the interior of the inner casing 18 and the clutch disks 86 are provided with similar notches on their inner periphery which engage corresponding projections 88 on the exterior of the second speed ring gear 54 at one side of the centrifugal device.

Suitable means operated by centrifugal force are employed for forcing the disks into frictional contact. As shown, the centrifugal clutch operating device comprises a hollow casing 91 in which is slidably mounted a centrifugal weight or weight element 92. There are a plurality of these clutch operating devices extending about the peripheral portion of the inner casing. Since they are alike, only one need be described. The casings 91 extend through openings in the peripheral wall of the recess 135. The outer end of each casing 91 is closed and the casing is provided adjacent its outer end with suitable attaching flanges and a spring 93 is interposed between the centrifugal weight element 92 and the bottom of the casing 91. The weight element 92 is preferably provided with an extension 94 which is surrounded by the inner end of the spring 93. The weight 92 is provided with a transverse opening 95 within which is mounted the lever actuating device 96 (see Figs. 1 and 4). This device comprises a head 97 having the lugs 98 extending outwardly therefrom and between which is rotatably mounted an anti-friction wheel or roller 99 adapted to engage a clutch operating lever 101, as will presently appear. The head 97 is provided with a cylindrical body portion 102 which is adapted to slidably engage in an opening in a cap 103. The cap 103 is provided with outwardly projecting lugs (see Fig. 1) within which is mounted the roller 105 which is adapted to engage a clutch operating lever 106 for operating the high speed clutch 100, as will hereinafter appear. A compression spring 107 is mounted on the cylindrical body portion 102 and tends to separate the head 97 and cap 103 whereby the rollers 99 and 105 are forced outwardly against the clutch operating levers 101 and 106.

The casing 91 is provided with slots in its sides through which the head 97 and cap 103 may extend during the operation of the device. The clutch operating levers 101 and 106 are pivoted at opposite sides of the casing 91 between the lugs 110 and 111 extending outwardly at the sides of the slots.

The high speed clutch 100 comprises a group of two sets of intercalated annular friction disks 116 and 117. The disks 116 are fixed to the inner casing 18 and the disks 117 are locked to the disk 45. The high speed clutch device is located on the opposite side of the casing 91 from the clutch device 84. The inner friction plates of the clutch devices are provided with recesses 112 and 113, respectively, for receiving the end portions of the levers 101 and 106 for guiding the same. These levers have their outer ends extended and curved inwardly for engaging the side walls of the casing 91 for limiting their inward movement upon release. The levers 101 and 106 are preferably so constructed that the spring 93 will remain under constant compression in any position of the weight member 92. The parts are so arranged that when the weight 92 is thrown outwardly by centrifugal force, the roller 99 will engage the inclined surface 114 of the lever 101 outwardly of its pivot for clamping the disks in the group 84 for locking the second speed ring gear 54 to the inner casing 18 when the speed of said casing exceeds a predetermined minimum. At this time, the roller 105 will be travelling upwardly along the incline 115 of the lever 105 inwardly of its pivot, thereby holding this lever in non-clamping position and maintaining the spring 93 in substantially constant compression. The drive then will be through the shaft 27, gears 48 and 53, casing 18 and driven shaft 31. At this time, the inner casing 18 will be travelling faster than the first speed ring gear 51, thereby releasing the clutch 57.

The gear ratio is such that the ratio of the rotation of the driving and driven shafts will be less than that of the first speed but the shaft 31 will move more slowly than the shaft 27, thereby securing second or intermediate speed.

*High speed*

When the speed of the inner casing 18 is further increased and reaches a predetermined minimum, the weight 92 will be forced still further outwardly by centrifugal action and the roller 105 will pass the pivot of the lever 106 and engage the inclined surface 120 thereof for forcing the friction plates of the clutch 100 into frictional engagement for locking the disk 45 to the inner casing 18. As the roller 105 passes dead center and travels down the inclined surface 120, the roller 99 of the lever 101 will travel upwardly along the inclined surface 136 of said lever whereby the compression of the spring 93 will remain constant. The drive will now be directly through the shaft 27 and the inner casing 18. Since the inner casing 18 is clutched to both the high speed ring gear 54 and the arms 45, the shaft 42 is held from rotation on its axis and consequently the gear 49 which is on the shaft 42 will carry with it the outer casing 17. In other words, the two casings 17 and 18 rotate together at crank shaft speed.

*Reverse*

When it is desired to reverse or rotate section 33 of the driven shaft 31 in the opposite direction from the driving shaft 27, the driven shaft is declutched from the engine in the usual manner and the shifter member 72 is moved rearwardly by moving the lever 82 downwardly in Fig. 5. This operation will disengage the shifter member from the clutch teeth 71 on the sleeve 67 and will shift the teeth 75 into engagement with the gear 68. The shifting of the selector member 72 will cause the teeth 90 thereof to engage the pinion 36 for locking the shaft section 32 and the inner casing 18 from rotation. The drive will then be through the shaft 27, pinion 46 and internal gear 49 which will cause the rotation of the outer casing 17. Since the inner casing 18 is held stationary and the first speed ring gear 52 is locked to this inner casing by the overrunning clutch mechanism 57, the reaction of the pinion 46 on the gear 49 will cause the outer casing 17 to rotate counterclockwise at a greatly reduced speed. The rotation of the outer casing 17 through the ring gear 62 and clutch 65 will drive the gears 66, 68 and 75 and the rear section 33 of the driven shaft 31 in reverse direction—that is, in the same direction as the rotation of the outer casing.

The outer casing 17 is adapted to contain oil for lubricating the parts. It may be provided with openings closed by plugs 137 at various points about its periphery for receiving or discharging oil, as occasion may require.

The form of construction shown in Fig. 7 differs from that just described in that an outer housing 117 is employed for surrounding the change speed device. This housing is preferably in sections 118 and 119 connected together in any suitable manner, as by means of the cap screws 138. The forward end of this housing may, if desired, be integral with the clutch housing 121 and the rear section may be integral with the housing 19. This housing may contain oil and the casings 17 and 18 be skeletonized, if desired.

It is thought from the foregoing taken in connection with the accompanying drawings that the construction and operation of our device will be apparent to those skilled in the art and that changes in size, shape, proportion and details of construction may be made without departing from the spirit and scope of the appended claims.

We claim as our invention:

1. In combination, a drive shaft, a driven shaft, said driven shaft comprising a forward section and a rear section, a clutch for connecting the shaft sections together, and means including permanently intermeshing gear mechanism for rotating said sections when the same are clutched together, said mechanism comprising internal gears and pinions engaging the same, and means including said gears for rotating said rear section to the exclusion of said forward section.

2. In combination, a drive shaft, a driven shaft, change speed mechanism between said shafts, said mechanism comprising a rotatable outer casing, means for preventing rotation of the same, an inner casing rigidly connected to said driven shaft and means including over-running clutch elements within said outer casing for automatically changing the speed ratio between said driving and driven shafts when the speed of said inner casing rises above a predetermined minimum.

3. In combination, a drive shaft, a driven shaft, change speed mechanism between said shafts, said mechanism comprising an outer casing, an inner casing rigidly connected to said driven shaft and means within said outer casing controlled by the speed of said inner casing for rotating one of said casings to the exclusion of the other for operating said driven shaft at a slower speed than said driving shaft and means for locking said casings together for synchronizing the rotation of said shafts.

4. In a motor vehicle having an instrument board and provided with the conventional internal combustion engine having a crank shaft and clutch therefor, the combination of a driving shaft adapted to be clutched to said crank shaft for driving said vehicle, a driven shaft, means for connecting said driving and driven shafts for causing them to rotate together at the same speed, said driven shaft comprising a front section and a rear section, a clutch element and shiftable gears between said shaft sections and means extending to said instrument board for operating said clutch element and for shifting said gears.

5. In a change speed device, a driving shaft, a driven shaft, mechanism including a plurality of internal gears for driving said driven shaft from said driving shaft at three speed ratios in forward direction and one in reverse direction, and means including overrunning clutch elements for automatically changing from one forward speed ratio to another when the speed of said driven shaft reaches a predetermined amount while increasing from a lower to a higher speed or while decreasing from a higher to a lower speed.

6. In a conventional motor vehicle provided with an instrument board, a motor for said vehicle, a driving shaft, a driven shaft, change speed mechanism between said shafts, a clutch between said motor and mechanism, said mechanism comprising shiftable means for driving said driven shaft from said driving shaft at a plurality of speed ratios forward and at one speed ratio in reverse, said mechanism comprising means for locking said shafts together for causing the same to rotate at the same speed, means on said instrument board for shifting said first-named means to drive forward or backward and automatically operated means including overrunning clutch elements for changing the speed ratios of said shafts without increasing or reducing the fuel supply to the engine when the speed of said driving shaft increases or decreases a predetermined amount during forward drive.

7. In a change speed device, a fixed casing, an outer casing having one end journaled in said fixed casing, an inner casing journaled in said outer casing, a driving shaft journaled within said outer and inner casings, a driven shaft journaled in said fixed casing, change speed mechanism for operating said driven shaft from said driving shaft, means for locking said outer casing against rotation for causing said mechanism to operate said driven shaft at lowest speed from said driving shaft, means for automatically locking certain elements of said mechanism to said inner casing for causing said mechanism to drive said driven shaft from said driving shaft at intermediate speed and means for locking said casings and mechanism together for causing said shafts to turn at the same rate of speed.

8. In a change speed device, a driving shaft, a driven shaft, a gear support, mechanism carried by said support and driving shaft for operating said driven shaft from said driving shaft, a pair of clutches spaced apart, each clutch comprising two sets of intercalated friction plates, means for interlocking one set of each clutch to said support and the other set to said mechanism, and means operated by a centrifugal device for operating said clutches when said support exceeds predetermined speeds.

9. In a change speed device, a driving shaft, a driven shaft, means for directly coupling said shafts for direct driving, and change speed mechanism for driving said driven shaft from said driving shaft, said mechanism comprising means including a plurality of internal and planetary gears permanently in mesh and overrunning clutch means for automatically changing the relative speed ratio of said shafts when the speed of said driven shaft rises above a predetermined maximum for obtaining low, intermediate and high speeds only for said driven shaft and for automatically changing speed ratio for obtaining intermediate and low speeds when the speed of said driven shaft decreases to zero from its maximum.

10. In a change speed device, a driving shaft, a driven shaft and a change speed mechanism including a plurality of internal and planetary gears between said shafts for driving said driven shaft from said driving shaft, said mechanism comprising gears permanently in mesh, and means comprising plate clutch members and centrifugally operated means for controlling the operation of said members for automatically changing the gear ratio between said shafts to obtain low speed and for further changing the gear ratio between said shafts for obtaining intermediate speed, without disengaging any of the gears of said mechanism, said means comprising mechanism for locking said shafts together for causing the same to rotate together.

11. In a change speed device, a driving shaft, a driven shaft, change speed mechanism including a plurality of meshed gears between said shafts for driving said driven shaft from said driving shaft, and means including automatically operated centrifugal clutch mechanism and two sets of friction disk clutches for changing the gear ratio between said shafts without disengaging said gears for causing the driven shaft to change from low speed through intermediate to high and vice versa, depending on the speed of one of said shafts, said means comprising mechanisms for locking said gears against relative movement.

12. In combination, a drive shaft, a driven shaft, change speed mechanism between said shafts, said mechanism comprising a plurality of gears and pinions permanently in mesh, and means including centrifugal clutch mechanism having friction plates, said mechanism being controlled by the speed of said driven shaft for automatically changing the speed ratio of said shafts for causing the driven shaft to change from low speed through intermediate to high and vice versa, depending on the speed of said driven shaft, without disengaging said gears and pinions.

13. In combination, a driving shaft, a driven shaft, means including over-running clutch mechanism and a plurality of internal gears for operating said driven shaft from said driving shaft at a plurality of speed ratios above low speed or below high speed and for locking said shafts together for causing them to rotate together for obtaining high speed, automatically operated means including centrifugally operated mechanism for controlling the changing of the speed ratios of said shafts from a higher to a lower ratio or from a lower to a higher ratio.

14. In a change speed device, a driving shaft, a driven shaft, a plurality of sets of internal and planetary gears permanently in mesh between said shafts, means including a plurality of plate clutches and centrifugally operated members for automatically controlling the operation of one set of said gears for obtaining a predetermined gear ratio for driving said driven shaft from said driving shaft and for controlling the operation of another set of said gears for obtaining another gear ratio for driving said driven shaft at a different speed from said driving shaft.

JOSEPH. M. HALL.
HERBERT E. TUCKER.